United States Patent [19]

Gautam

[11] Patent Number: 4,969,636
[45] Date of Patent: Nov. 13, 1990

[54] FLY TYER'S VISE

[76] Inventor: Anil S. Gautam, 1707 Grandin Ave., Rockville, Md. 20852

[21] Appl. No.: 435,355

[22] Filed: Nov. 13, 1989

[51] Int. Cl.$^5$ .............................................. B25B 1/08
[52] U.S. Cl. ...................................... 269/71; 269/76; 269/157; 269/254 R; 269/236; 269/907
[58] Field of Search ............ 269/254 R, 254 CS, 239, 269/236, 235, 233, 237, 3, 6, 129, 157, 158, 269, 270, 907, 45, 76, 75

[56] References Cited

U.S. PATENT DOCUMENTS

| | | | |
|---|---|---|---|
| 1,039,831 | 10/1912 | Sisson | 269/76 |
| 1,077,661 | 11/1913 | Wilcoxson et al. | 269/76 |
| 1,084,130 | 1/1914 | Cargin | 269/45 |
| 1,306,858 | 6/1919 | Salter | 269/45 |
| 1,323,127 | 11/1919 | Trevthardt | 269/45 |
| 1,670,253 | 5/1928 | Gilbert et al. | 269/45 |
| 4,145,006 | 3/1979 | Webb | 269/76 |
| 4,322,065 | 3/1982 | Doiron . | |
| 4,375,284 | 3/1983 | Doiron | 269/907 |
| 4,500,077 | 2/1985 | Coxon | 269/45 |

Primary Examiner—Robert C. Watson

[57] ABSTRACT

A fly tyer's vise which has a pair of spring members at one end so as to receive and clamp a fish hook and which can be separated by a cam operated lever wherein said jaws are mounted on a shaft received in an adaptor such that when the supporting shaft is in the horizontal position, the jaws and fish hook can be rotated 360° about a horizontal axis so as to allow the fly to be adjusted to all angular positions. A set screw passes through the adapter and is received in a groove in the supporting shaft for the fish hook jaws and a generally spherical knob fits over an extending end of the support shaft.

1 Claim, 1 Drawing Sheet

U.S. Patent        Nov. 13, 1990        4,969,636
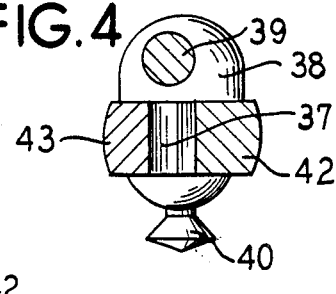
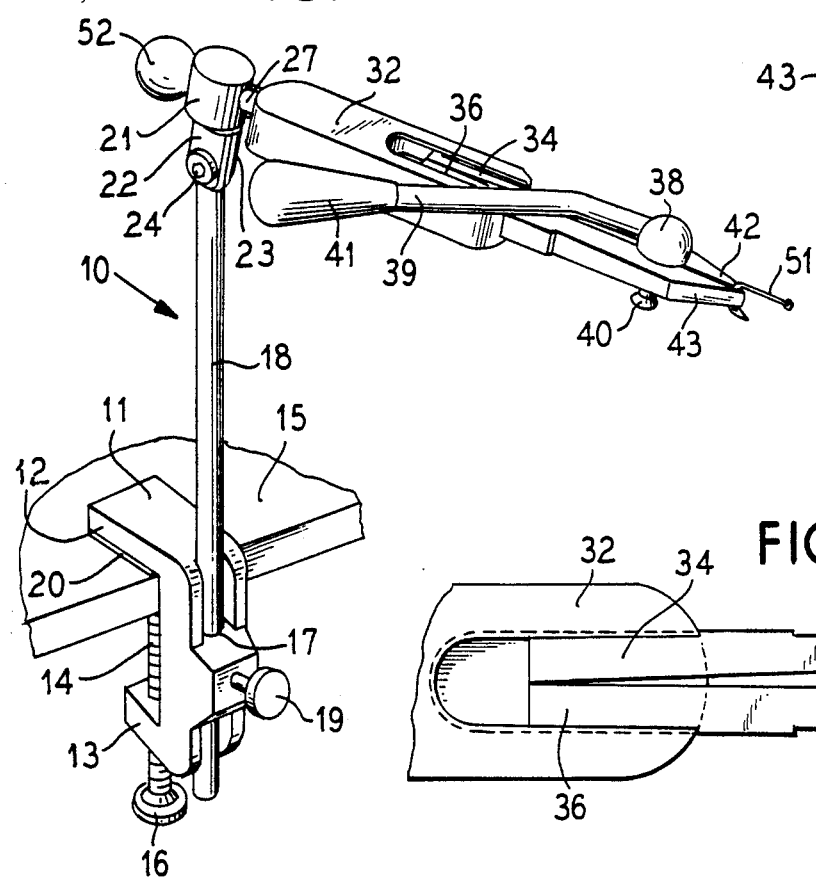
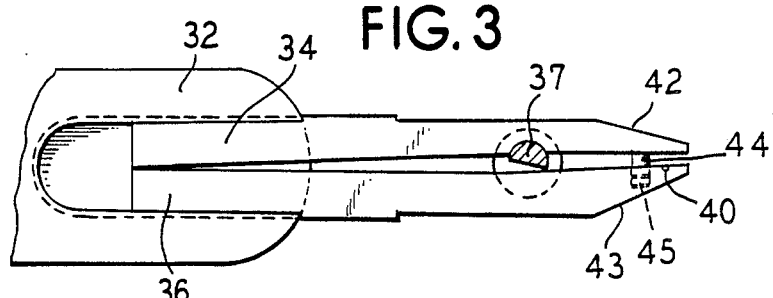
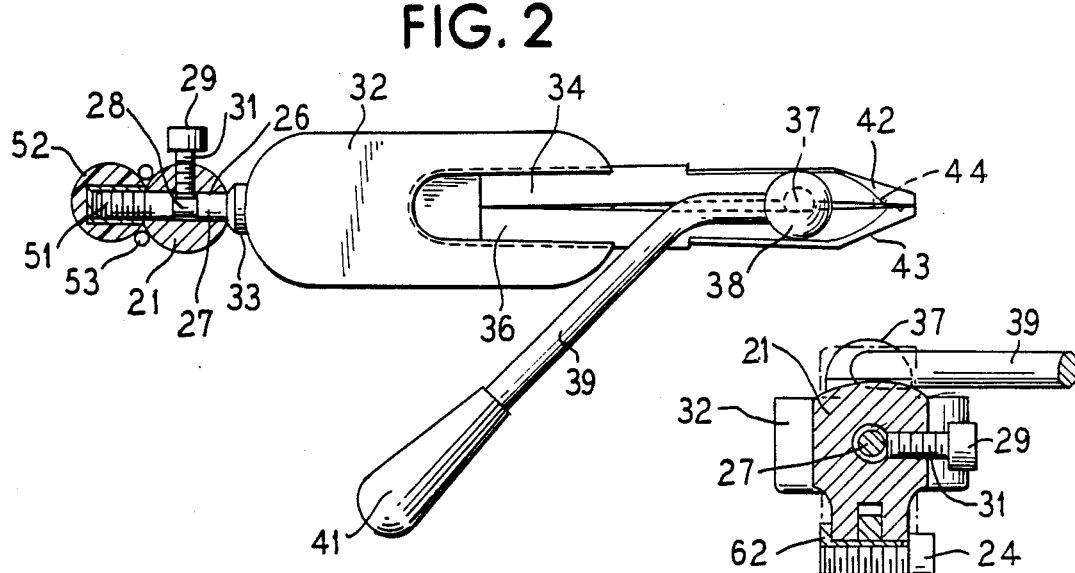
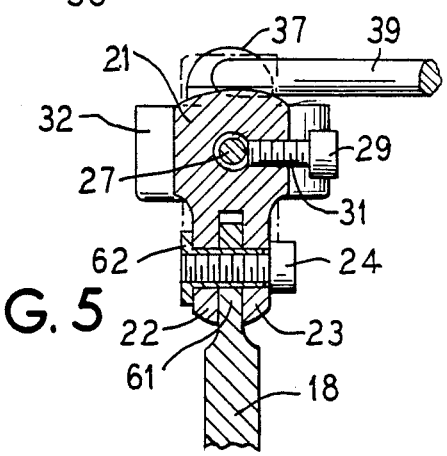

FLY TYER'S VISE

BACKGROUND OF THE INVENTION

1. Field of the Invention

This invention relates in general to a fly tyer's vise which can be adjusted 360° relative to a horizontal supporting shaft.

2. Description of Related Art

Reference may be made to U.S. Pat. Nos. 4,322,065 and 4,375,284 for fly tyer's vises.

SUMMARY OF THE INVENTION

A fly tyer's vise which has a pair of fish hook clamping jaws that can be selectively opened and closed to hold a fish hook and wherein the fly tying jaws are mounted on a shaft that is supported by an adapter which is pivotally attached to another shaft normally supported vertically and clamped to a support with a suitable clamp. The present invention provides that the adapter rotatably and adjustably supports the jaws of the fly tyer's vise such that the jaws can be rotated 360° relative to the adapter. The supporting shaft for the jaws is formed with a groove into which a set screw is received and the shaft extends through the adapter and a generally spherical knob is threadedly received on the extending portion of such shaft. The fact that the jaws can be rotated 360° allows the user to more easily tie flies than is possible with fly tyer's vises of the prior art.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a perspective view of the fly tyer's vise of the invention;

FIG. 2 is a top plan view partially in section of the fly tyer's vise;

FIG. 3 is an enlarged top plan view of the fish hook holding jaws of the invention;

FIG. 4 is a sectional view through the jaws of the invention; and

FIG. 5 is a sectional view through the adapter of the invention.

DESCRIPTION OF THE PREFERRED EMBODIMENTS

As shown in FIG. 1, for example, the fly tyer's vise 10 of the invention can be mounted on a table or other suitable support 15 with a clamp 11 of generally C-shape which has jaws 12 and 13 which can be locked by a threaded shaft 14 with a knob 16 to the member 15. The jaw 12 might have a protective cushion 20 on its under side so as to protect the surface of the support 15. A vertical supporting shaft 18 extends through an opening 17 formed in the clamp 17 and can be locked with a set screw 19 which allows it to be adjusted vertically and also at any angle about the vertical axis of the shaft 18. An adapter 21 is pivotally attached to the upper end of the shaft 18 and the adapter 21 has a pair of jaws 22 and 23 as shown in FIG. 5 which mate with a flattened portion 61 of the upper end of shaft 18. A female threaded boss 62 extends through openings in the jaws 22 and 23 and flattened portion 61 and can be tightened with a set screw 24 which has an opening in its head for receiving alan wrench, for example.

The upper portion of the adapter 21 is formed with an opening 26 through which a shaft 27 extends as shown in FIGS. 1, 2 and 5 and the shaft 27 is formed with a grooved portion 28 into which the end of a set screw 31 can be received which is threadedly received in the adapter 21. The head 29 of the set screw 31 can be rotated with a suitable wrench to tighten the set screw on the shaft 27. As best shown in FIGS. 1 and 2, the shaft 27 has an extending threaded portion 51 which extends beyond the adapter 21 and is adapted to receive a generally spherically shaped knob 52 thereon. A spring 53 may be mounted between the knob 52 and the adapter 21 as shown in FIG. 2.

A metal jaw supporting member 32 is supported on the other end of shaft 27 and supports a pair of jaws 34 and 36. A cam shaft 37 is mounted between the jaws 34, 36 adjacent their fish hook clamping portions 42 and 43 and has an enlarged portion 40 on one end thereof as shown in FIG. 4 and a top cap 38 as shown in FIG. 4, 1 and 2. A handle 39 is connected to the top cap 38 and has a handle portion 41 so as to rotate the cam shaft 37 so as to selectively separate the jaws 42 and 43. A guide pin 44 is attached to jaw 42 and extends in an opening 45 in the jaw 43. The pin 44 serves as a limit means for a fish hook 51 when it is placed in the jaws 42 and 43. A groove 40 is formed in the jaw 43 so as to receive the fish hook therein.

In use, the clamp 11 is firmly attached to the support member 15 using the knob 16 to tighten shaft 14. Then the shaft 18 is adjusted vertically and angularly relative to the clamp 11 by loosening the set screw 19 and moving the vise to the desired selected position after which the set screw 19 is tightened. Then the angle of the vise is adjusted relative to the horizontal by loosening the set screw 24 to adjust the angle of a shaft 27 relative to the horizontal after which the set screw 24 is tightened. Then the angular position of the shaft 27 can be adjusted relative to the adapter 21 by loosening the set screw 29 and by rotating the shaft 27 and the vise relative to the member 21 about a substantially horizontal axis. At the desired position, the set screw 29 may be tightened so as to lock the shaft 27 in the selected position. The spherical knob 52 and spring 53 can also apply some locking force to the shaft 27 as shown in FIG. 2.

Then the handle 41 is rotated to open the jaws 42 and 43 and a suitable fish hook 51 is inserted between the jaws and the handle 41 is then rotated to allow the jaws to firmly clamp the hook 51. Then the user can tie a fly and he can selectively rotate the hook 51 by adjusting the angle of the shaft 27 relative to the adapter 21 by selectively loosening the set screw 31 to rotate the shaft 27 and the jaws 34 and 36.

It is seen that the present invention provides a novel fly tyre's vise which can be adjusted 360° relative to the adapter and although the invention has been described with respect to preferred embodiments, it is not to be so limited as changes and modifications can be made which are within the full intended scope of the invention as defined by the appended claims.

I claim as my invention:

1. A fly tyer's vise comprising a pair of jaws between which a fish hook can be mounted, a first support shaft attached to said pair of jaws, an adapter formed with an opening through which said first support shaft rotatably extends, a set screw mounted in said adapter to selectively lock said first shaft in a selected angular position relative to said adapter, a second vertically extending shaft pivotally attached to said adapter, a clamp for attaching said vise to a supporting member and formed with an opening through which said second vertical shaft extends, means for locking said second vertical shaft to said clamp, wherein said first support shaft is formed with a groove into which one end of said set screw can be received, wherein one end of said first support shaft extends through said adapter a knob is mounted on said one end, and comprising an annular spring mounted between said knob and said adapter.

* * * * *